US012459333B2

(12) United States Patent
Salter et al.

(10) Patent No.: US 12,459,333 B2
(45) Date of Patent: Nov. 4, 2025

(54) CLIMATE MANAGEMENT SYSTEM FOR A COMPARTMENT OF A VEHICLE

(71) Applicant: Ford Global Technologies, LLC, Dearborn, MI (US)

(72) Inventors: Stuart C. Salter, White Lake, MI (US); Michael Hrecznyj, Livonia, MI (US); Sarah Marie Shaw, Commerce Township, MI (US); Jeff Robert Seaman, Petersburg, MI (US); Brendan Diamond, Grosse Pointe, MI (US); Annette Lynn Huebner, Highland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 274 days.

(21) Appl. No.: 18/127,995

(22) Filed: Mar. 29, 2023

(65) Prior Publication Data

US 2024/0326556 A1 Oct. 3, 2024

(51) Int. Cl.
*B60H 1/00* (2006.01)

(52) U.S. Cl.
CPC ..... *B60H 1/00885* (2013.01); *B60H 1/00807* (2013.01); *B60H 1/00985* (2013.01)

(58) Field of Classification Search
CPC ......... F25D 2331/804; F25D 2331/801; F25D 11/003; F25D 23/069; F25D 3/06; F25D 3/08; F25D 2400/12
See application file for complete search history.

(56) References Cited

U.S. PATENT DOCUMENTS

| 3,505,830 | A | * | 4/1970 | Koerner | B60N 3/104 62/331 |
| 3,850,006 | A | * | 11/1974 | Redfern | F25D 3/005 62/298 |
| 4,483,151 | A | * | 11/1984 | Fujioka | F25D 11/022 62/157 |
| 4,637,222 | A | * | 1/1987 | Fujiwara | F25D 16/00 62/298 |
| 4,765,151 | A | * | 8/1988 | Bessey | F25D 3/06 62/239 |
| 6,973,799 | B2 | * | 12/2005 | Kuehl | B60H 1/32281 62/434 |
| 6,997,004 | B1 | * | 2/2006 | Pittman | B60H 1/32 62/244 |

(Continued)

*Primary Examiner* — Nelson J Nieves
(74) *Attorney, Agent, or Firm* — Vichit Chea; Price Heneveld LLP

(57) ABSTRACT

A climate management system for a compartment of a vehicle includes a divider selectively disposed in the compartment to divide the compartment into two zones in response to connection with a wall of the compartment. The system further includes a sensor monitoring the compartment and configured to detect the divider in the compartment. The system further includes at least one fluid connection in the compartment. The system further includes at least one actuator configured to control fluid flow through the at least one fluid connection. The system further includes control circuitry in communication with the sensor and the at least one actuator and is configured to communicate a signal to adjust the at least one actuator based on the detection of the divider.

12 Claims, 7 Drawing Sheets

(56) References Cited

U.S. PATENT DOCUMENTS

| | | | | |
|---|---|---|---|---|
| 7,043,926 | B2* | 5/2006 | Smith | B60H 1/00207 62/89 |
| 8,789,715 | B2* | 7/2014 | Shea | B65D 11/18 220/6 |
| 10,059,238 | B1* | 8/2018 | Salter | G03B 21/56 |
| 10,953,721 | B2* | 3/2021 | Gruber | H01M 10/615 |
| 11,214,185 | B2* | 1/2022 | Qiu | B60K 1/04 |
| 11,340,005 | B2* | 5/2022 | Nilsen | F25D 16/00 |
| 11,634,062 | B1* | 4/2023 | Roy | B60H 1/00742 296/24.41 |
| 11,731,549 | B2* | 8/2023 | Bursch | B60N 3/104 224/404 |
| 11,772,448 | B2* | 10/2023 | Lange | B60H 1/00271 705/332 |
| 11,932,077 | B2* | 3/2024 | Harmon | B60H 1/00592 |
| 11,981,245 | B1* | 5/2024 | Roy | B60H 1/004 |
| 12,005,758 | B1* | 6/2024 | Hrecznyj | B60H 1/00592 |
| 12,023,987 | B2* | 7/2024 | Axelson | B60H 1/00771 |
| 12,145,422 | B1* | 11/2024 | Otten | B60H 1/00842 |
| 2012/0099255 | A1* | 4/2012 | Lee | F25D 25/025 361/679.01 |
| 2019/0016267 | A1* | 1/2019 | Putcha | B65D 88/745 |
| 2019/0337358 | A1 | 11/2019 | Wamsley | |
| 2020/0094651 | A1 | 3/2020 | Ostrowski et al. | |
| 2021/0155071 | A1* | 5/2021 | Lange | B60H 1/00271 |
| 2022/0227299 | A1 | 7/2022 | Gombert et al. | |
| 2022/0274461 | A1* | 9/2022 | Axelson | B60H 1/0025 |
| 2024/0025229 | A1* | 1/2024 | Donnellan | F25D 11/003 |
| 2024/0174444 | A1* | 5/2024 | Matsui | B65G 1/1371 |

* cited by examiner

CLIMATE MANAGEMENT SYSTEM FOR A COMPARTMENT OF A VEHICLE

FIELD OF THE DISCLOSURE

The present disclosure generally relates to a climate management system for a compartment of a vehicle and, more particularly, to inventory management for a climate-controlled frunk of a vehicle.

BACKGROUND OF THE DISCLOSURE

Conventional climate management techniques are typically employed in compartments of vehicles. A need for a more robust and dynamic climate management system is desired.

SUMMARY OF THE DISCLOSURE

According to a first aspect of the present disclosure, a climate management system for a compartment of a vehicle includes a divider selectively disposed in the compartment to divide the compartment into two zones in response to connection with a wall of the compartment. The system further includes a sensor monitoring the compartment and configured to detect the divider in the compartment. The system further includes at least one fluid connection in the compartment. The system further includes at least one actuator configured to control fluid flow through the at least one fluid connection. The system further includes control circuitry in communication with the sensor and the at least one actuator and configured to communicate a signal to adjust the at least one actuator based on the detection of the divider.

Embodiments of the first aspect of the present disclosure can include any one or a combination of the following features:
- the at least one fluid connection includes a first fluid connection controlled by a first actuator and in fluid communication with a first zone of the two zones;
- a container coupled with the first fluid connection providing fluid communication to an inside of the container;
- the inside of the container is fluidly isolated from a remainder of the first zone;
- a thermal imager in communication with the control circuitry and configured to capture thermal data of the compartment, wherein the control circuitry is further configured to determine a plurality of climates in the compartment based on the thermal data;
- a wireless communication circuit in communication with the control circuitry and configured to receive purchase information for a user, wherein the control circuitry is further configured to estimate an identity of objects to be placed in the compartment based on the purchase information;
- a camera in communication with the control circuitry and configured to capture images of a region exterior to the vehicle, wherein the control circuitry further comprises an image processor configured to estimate an identity of the objects to be stored in the compartment based on the images;
- the image processor is further configured to determine target placements for the objects based on the identity of the objects and the plurality of climates;
- determining the target placements is based further on a target temperature for the objects, wherein the control circuitry is further configured to estimate the target temperature for the objects based on the identity of the objects;
- the control circuitry is further configured to communicate an indication to place the objects in the target placements;
- a projector in communication with the control circuitry and configured to project the indication in the compartment;
- the indication includes a light pattern illuminating the target placements;
- the at least one fluid connection includes a second fluid connection controlled by a second actuator and in fluid communication with a second zone of the two zones, wherein the plurality of climates includes a first climate corresponding to the first zone and a second climate corresponding to the second zone;
- the control circuitry is further configured to selectively activate the first and second actuators to adjust the first climate and the second climate; and
- a display in communication with the control circuitry and configured to present options to a user, wherein the control circuitry is configured to control heating and cooling of the compartment based on selection of the options.

According to a second aspect of the present disclosure, a climate management system for a compartment of a vehicle includes a divider selectively disposed in the compartment to divide the compartment into two zones in response to connection with a wall of the compartment. The system further includes a sensor monitoring the compartment and configured to detect the divider in the compartment. The system further includes a camera configured to capture an image of objects to be stored in the compartment. The system further includes control circuitry in communication with the sensor, the camera, and the first actuator, and configured to determine an identity of an object to be stored in the compartment based on the image, determine one of the two zones to place the object based on the identity, and communicate an instruction to present an indication of the one of the two zones to place the object.

Embodiments of the second aspect of the present disclosure can include any one or a combination of the following features:
- a thermal imager in communication with the control circuitry and configured to capture thermal data of the compartment, wherein the determination of the one of the two zones to place the object is based further on the thermal data; and
- a projector in communication with the control circuitry and configured to project the indication in the compartment.

According to a third aspect of the present disclosure, a vehicle includes a compartment. The vehicle further includes a divider selectively disposed in the compartment to divide the compartment into two zones in response to connection with a wall of the compartment. The vehicle further includes a thermal imager configured to capture thermal data of the compartment. The vehicle further includes a camera configured to capture image data of a region exterior to the vehicle. The vehicle further includes a fluid connection in the compartment. The vehicle further includes an actuator configured to control fluid flow through the fluid connection. The vehicle further includes control circuitry in communication with the thermal imager, the camera, and the actuator and configured to determine a plurality of climates in the compartment based on the thermal data, determine an identity for the objects to be placed in the compartment based on the image data, determine target placements for the objects based on the identity of the objects and the plurality of climates, and communicate an indication to place the objects in the target placements.

Embodiments of the third aspect of the present disclosure can include any one or a combination of the following features:

the target placements is based further on a target temperature for the objects, wherein the control circuitry is further configured to estimate a target temperature for the objects based on the identity of the objects.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
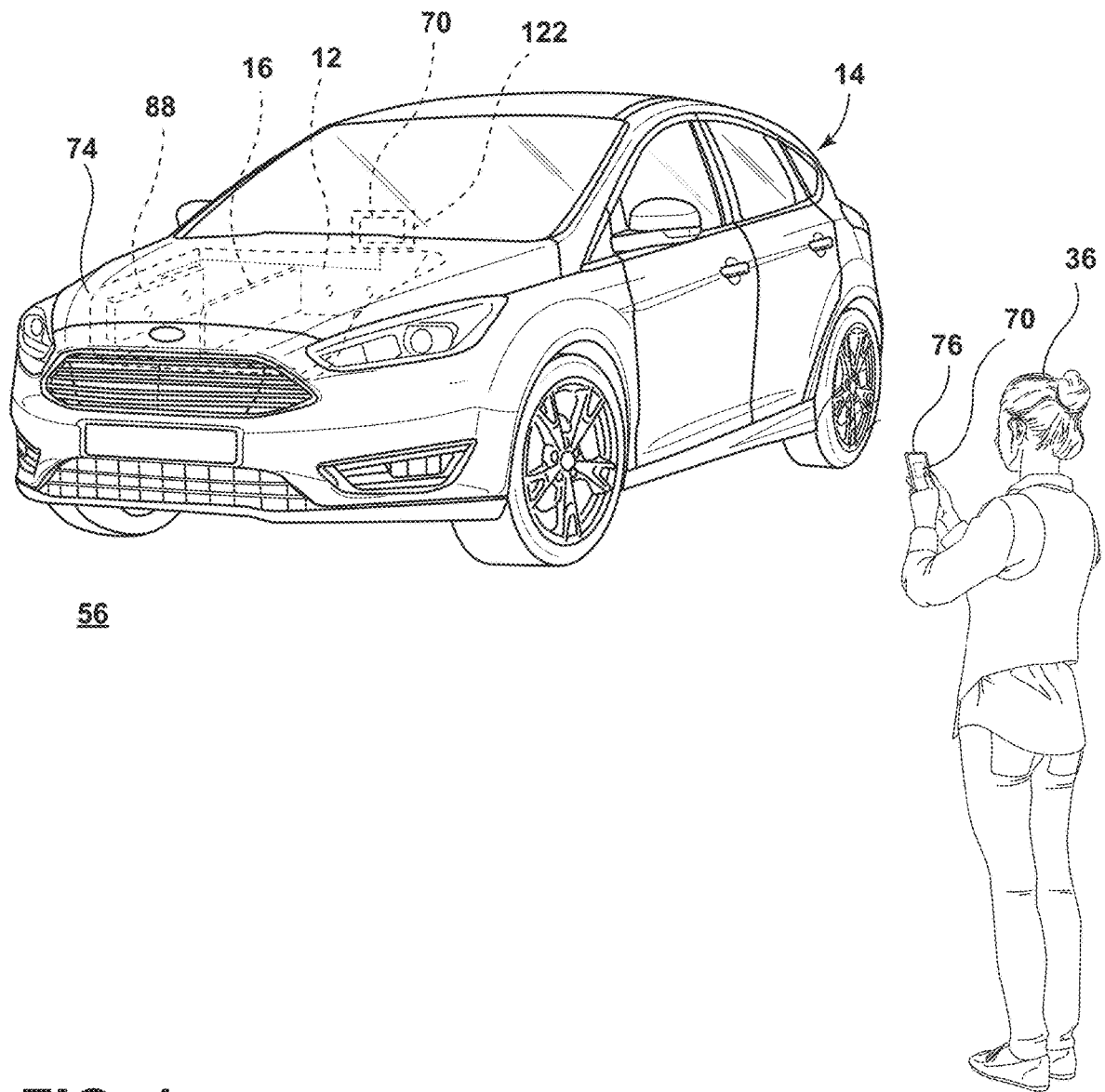
FIG. 1 is a perspective view of a vehicle having a climate-controlled frunk according to one aspect of the present disclosure.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements may or may not be to scale and certain components may or may not be enlarged relative to the other components for purposes of emphasis and understanding.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a climate management system for a compartment of a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring generally to FIGS. 1-7, the present disclosure relates to a climate management system 10 for a compartment 12 of a vehicle 14. The climate management system 10 includes a divider 16 selectively disposed in the compartment 12 to divide the compartment 12 into two zones 18, 20, in response to connection with a wall 22 of the compartment 12. The climate management system 10 further includes a sensor 24 monitoring the compartment 12 and configured to detect the divider 16 in the compartment 12. At least one fluid connection 26, 28 is in the compartment 12. At least one actuator is configured to control fluid flow through the at least one fluid connection 26, 28. Control circuitry 34 is in communication with the sensor 24 and the at least one actuator. The control circuitry 34 is configured to communicate a signal to adjust the at least one actuator, based on the detection of the divider 16. In general, the climate management system 10 of the present disclosure may provide for enhanced thermal control for the compartment 12 of the vehicle 14 by employing internal and/or external monitoring and detection techniques to identify items that have target thermal properties and guide a user 36 to place the items in optimal positions within the compartment 12. Other enhancements may be provided by the present climate management system 10 and will be described herein.

According to some examples, the at least one fluid connection 26, 28 includes a first fluid connection 26 controlled by a first actuator of the at least one actuator. The first fluid connection 26 is in fluid communication with a first zone 18 of the two zones 18, 20. The at least one actuator may refer to valving, solenoids, heating devices, blowers, or any mechanism configured to effectuate climate adjustments in the compartment 12. The at least one fluid connection 26, 28 may further include a second fluid connection 28 controlled by a second actuator of the at least one actuator. The second actuator may be in fluid communication with a second zone 20 of the two zones 18, 20. By providing a plurality of fluid connections 26, 28 in the compartment 12, heating and/or cooling of the compartment 12 may be achieved simultaneously in different areas within the compartment 12.

In some examples, the climate management system 10 further includes a container 38 that is coupled with the first fluid connection 26 providing fluid communication to an inside 40 of the container 38. For example, the container 38 may be a thermally insulated box, such as a cooler, that may be heated or cooled when engaging the first fluid connection 26. The container 38 may selectively coupled with the wall 22 of the compartment 12, such that the container 38 may serve as a portable cooler. In some examples, the inside 40 of the container 38 is fluidly isolated from a remainder 42 of the first zone 18. For example, the climate management system 10 may be operable to cool the inside 40 of the container 38 and heat the remainder 42 of the first zone 18 and/or some or all of the second zone 20.

In some examples, the climate management system 10 further includes a thermal imager 44 in communication with the control circuitry 34. The thermal imager 44 may be configured to capture thermal data of the compartment 12. The control circuitry 34 may further be configured to determine a plurality of climates in the compartment 12 based on the thermal data. For example, the thermal data may include temperatures or a temperature contour of the two zones 18, 20, and the plurality of climates may have corresponding temperatures that may be detected by the thermal imager 44. It is contemplated that other detectors may be employed to monitor other aspects of the plurality of climates such as a humidity, an airflow, or another environmental condition.

In some examples, the climate management system 10 further includes a wireless communication circuit 50 in communication with the control circuitry 34 and configured to receive purchase information for the user 36. The control circuitry 34 may further be configured to estimate an identity of objects 52 to be placed in the compartment 12 based on the purchase information. For example, the wireless communication circuit 50 may incorporate networking capabilities that allow access to recent purchases by the user 36 or a pattern of purchasing based on historical data accessible by the wireless communication circuitry 50, and such access may allow the control circuitry 34 to estimate or predict types of food items or other items that have recommended temperature settings. Based on the recommended environmental settings, the control circuitry 34 may therefore control parameters of the climate management system 10 to adjust the environmental conditions of the compartment 12.

In some examples, the climate management system 10 further includes a camera 54 in communication with the control circuitry 34 and configured to capture images of a region exterior 56 to the vehicle 14. The control circuitry 34 may further include an image processor 58 that is configured to estimate an identity of the object 52 to be stored in the compartment 12 based on the images. For example, the camera 54 may be a visible-light, infrared (IR), near-infrared (NIR), or thermal camera that faces away from the compartment 12 to monitor the user 36 and/or capture images of the objects 52 to be stored. The image processor 58 may employ various image-processing algorithms, such as edge detection, filtering, recognition algorithms, image segmentation, or any other image processing technique that provides for classification of the objects 52. The image processor 58 may further be configured to determine target placements for the objects 52 based on the identity of the objects 52 and the plurality of climates. For example, upon classification of one object 52 as a refrigerable item and another object 52 as a non-refrigerable item, the climate management system 10 may identify the first zone 18 for the one object 52 and the second zone 20 for the other object. In some examples, the camera 54 is configured to capture images of the compartment 12 to allow for identification of contents already in the compartment 12.

Determining the target placements may be further based on a target temperature for the objects 52. The control circuitry 34 may further be configured to estimate the target temperature for the objects 52 based on the identity of the objects 52. For example, upon classification of the objects 52 as refrigerable or non-refrigerable, the control circuitry 34 may estimate higher or lower temperatures based on the classification of the item as refrigerable or non-refrigerable. The control circuitry 34 may further be configured to communicate an indication 64 to place the objects 52 in the target placements. For example, an audible or visual instruction may be presented to the user 36 to serve as the indication 64 of where to place the objects 52. In one example, the climate management system 10 includes a projector 66 that is in communication with the control circuitry 34 and is configured to project the indication 64 in the compartment 12. The indication 64 may include a light pattern 68 illuminating the target placements. For example, the projector 66 may be a video or image projection device that outputs the light pattern 68 in the form of words, numbers, colors, flashes, or any other light pattern that may serve as the indication 64 to the user 36 to place the objects 52 in the target placements.

Still referring generally to FIGS. 1-7, the plurality of climates includes a first climate corresponding to the first zone 18 and a second climate corresponding to the second zone 20. The control circuitry 34 may be configured to selectively activate the first and second actuators to adjust the first climate and the second climate. For example, the divider 16 and/or the container 38 in the compartment 12 may result in a difference in the plurality of climates, such as a warm region and a cool region in the compartment 12. Such difference in the plurality of climates, may be caused by exterior factors, such as sunlight, wind, outside temperature, or the like, or may be the result of the control circuitry 34 selectively activating the first and second actuators. The climate management system 10 may further include a display 70 that is in communication with the control circuitry 34 and is configured to present options 72 to the user 36. The control circuitry 34 may be configured to control heating and cooling of the compartment 12 based on the selection of the options 72. For example, the options 72 may be digital indicators or buttons on the display 70 that, when touched by the user 36, cause the control circuitry 34 to activate or deactivate the at least one actuator. Accordingly, the climate management system 10 may be operable in a manual mode that allows the users 36 to adjust the climate of the compartment 12.

With continued reference to FIGS. 1-7, the control circuitry 34 is configured to determine one of the two zones 18, 20 to place the object 52 based on the identity of the object 52 and communicate an instruction to present the indication 64 of the one of the two zones 18, 20 to place the object 52. In this way, the climate management system 10 of the present disclosure may automatically recommend the target placements for the objects 52 based on the image of the objects 52 to be stored in the compartment 12.

Referring now more particularly to FIG. 1, the compartment 12 may be a frunk of the vehicle 14. The frunk is a front trunk or front compartment 12 of the vehicle 14 in which an engine for the vehicle 14 and other systems for moving the vehicle 14 are traditionally stored. In examples in which the vehicle 14 is an electric vehicle (EV), the frunk may have availability for storing food goods and other items. A door 74 may selectively cover the compartment 12. As previously described, the container 38 may be disposed in the compartment 12 and may be selectively heated or cooled based on fluid communication between the inside 40 of the container 38 and the first fluid connection 26. It is contemplated that another compartment 12 may be utilized for the present climate management system 10, such as a trunk, a passenger cabin, or another region internal or in an external space of the vehicle 14. As illustrated, the user 36 may operate a mobile device 76 to communicate through the wireless communication circuit 50 with the control circuitry 34 via a software application on a mobile device 76. The mobile device 76 may be a phone, a tablet, or another electronic communication device.

Figure 2:
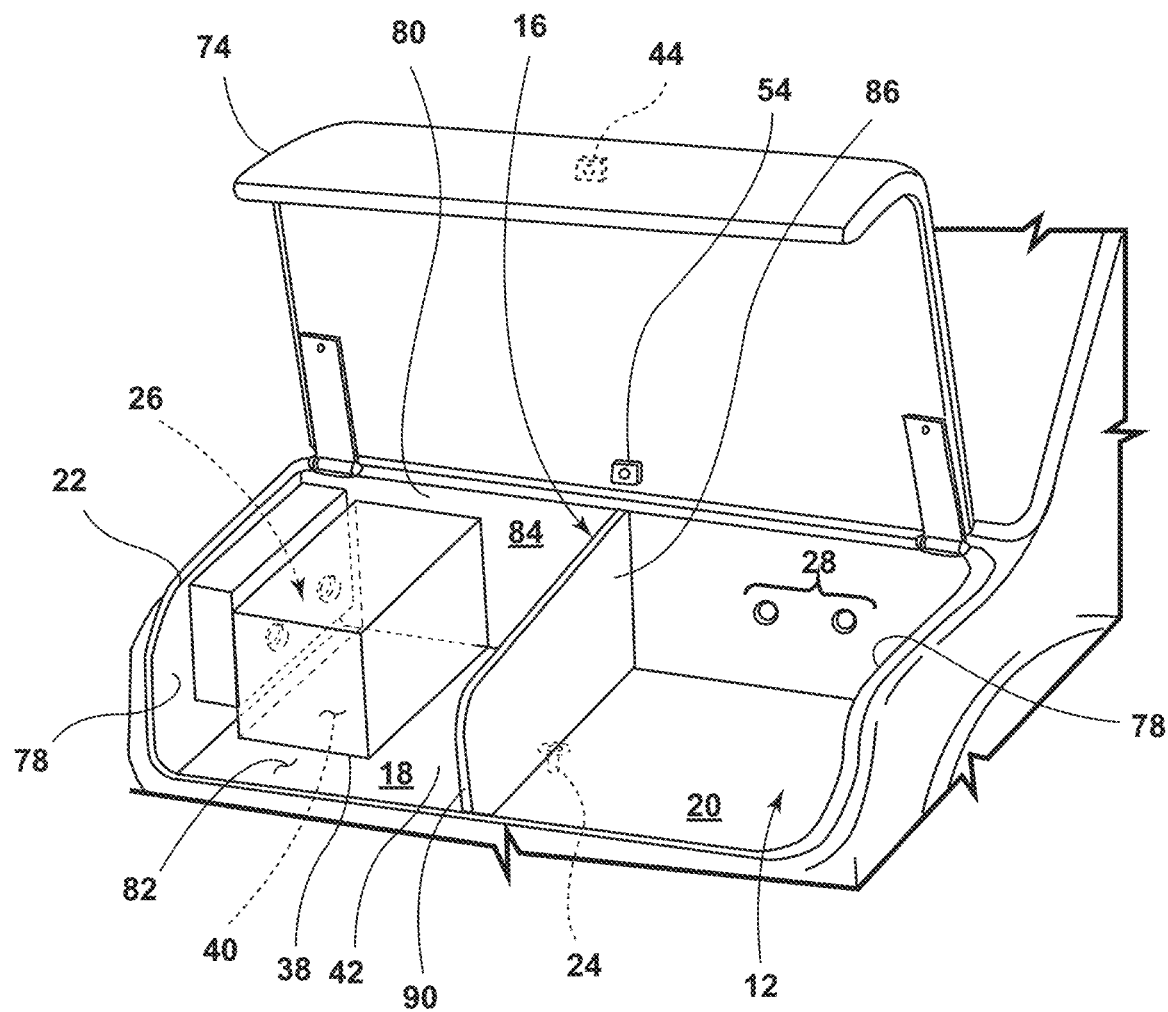
FIG. 2 is a perspective view of a frunk of a vehicle incorporating a divider dividing the frunk into two zones and illustrating a removable container for selective coupling with the frunk.

Referring now to FIG. 2, the wall 22 of the compartment 12 may form a pair of opposing sidewalls 78, a back wall 80 interposing the pair of opposing sidewalls 78, and a floor 82 extending between the sidewalls 78 and the backwall 80. The sidewalls 78, backwall 80, and the floor 82 may define an interior 84 of the compartment 12 in which the divider 16 and the container 38 are selectively disposed. As illustrated, the divider 16 may include a panel 86 that engages the back wall 80 and the floor 82 to divide the compartment 12 into the two zones 18, 20. However, it is contemplated that the container 38 may, in some examples, serve to divide the compartment 12 into the two zones 18, 20. For example, the first zone 18 may be in the inside 40 of the container 38, and the second zone 20 may be in the remainder 42 of the space surrounding the container 38 as well as the second zone 20. Thus, in general, the zones may refer to parts of the interior that are temperature controlled by one of the fluid connections 26, 28. In the example in which the container is coupled with the first fluid connection 26, the inside of the container may be the first zone, and the rest of the interior may be considered the second zone. Accordingly, the present climate management system 10 may produce a cold zone and a warm zone in the compartment 12 simultaneously by incorporating one or both of the container 38 and the divider 16.

For example, the first fluid connection 26 may be disposed on one of the opposing sidewalls 78, and the second fluid connection 28 may be disposed on the opposing sidewall 78 or on the backwall 80 on the other side of the divider 16. As will be described in reference to FIG. 3, the first and second fluid connections 26, 28 may have independent temperature/heat controls to allow for selective heating and cooling of the first and second zones 18, 20. In some examples, both the first and second fluid connections, 26, 28 are disposed in the first zone 18, with the first fluid connection 26 configured to interact with the container 38, and the second fluid connection 28 not in fluid communication with the inside 40 of the container 38, but rather configured to heat or cool the remainder 42 and/or the second zone 20. As will be further described herein in relation to FIG. 3, both the first and second fluid connections 26, 28 may be in fluid communication with a heat control system 88 for the compartment 12 of the vehicle 14. The heat control system 88 may include various thermal management devices, as will be further described in reference to FIG. 3. It is also contemplated that the first fluid connection 26 may be in fluid communication with the heat control system 88 for the compartment 12, and the second fluid connection 28 may be in fluid communication with a heating, ventilation, and air conditioning (HVAC) system 90 that is configured to support heating and cooling for the passenger compartment 12 and/or other compartments of the vehicle 14.

Still referring to FIG. 2, the sensor 24 may be embedded in the wall 22 at the backwall 80 and/or the floor 82. For example, the sensor 24 may be a proximity sensor, such as a light, ultrasonic, capacitive, or inductive sensor that may be flagged when the divider 16 overlays the sensor 24 or is near the sensor 24. Accordingly, the sensor 24 may serve as an on/off switch. In some examples, the sensor 24 is an analog sensor or includes image capturing (e.g., an imaging device) to detect the presence or absence of the divider 16. Other types of the sensor 24 employed may include a mechanical limit switch that is configured to interact with an edge 90 of the panel 86. For example, the sensor 24 may be a limit switch disposed in the floor 82, the backwall 80, or the door 74 that, when engaging the edge 90 of the panel 86, causes the limit switch to generate an electrical signal communicated to the control circuitry 34.

Figure 3:
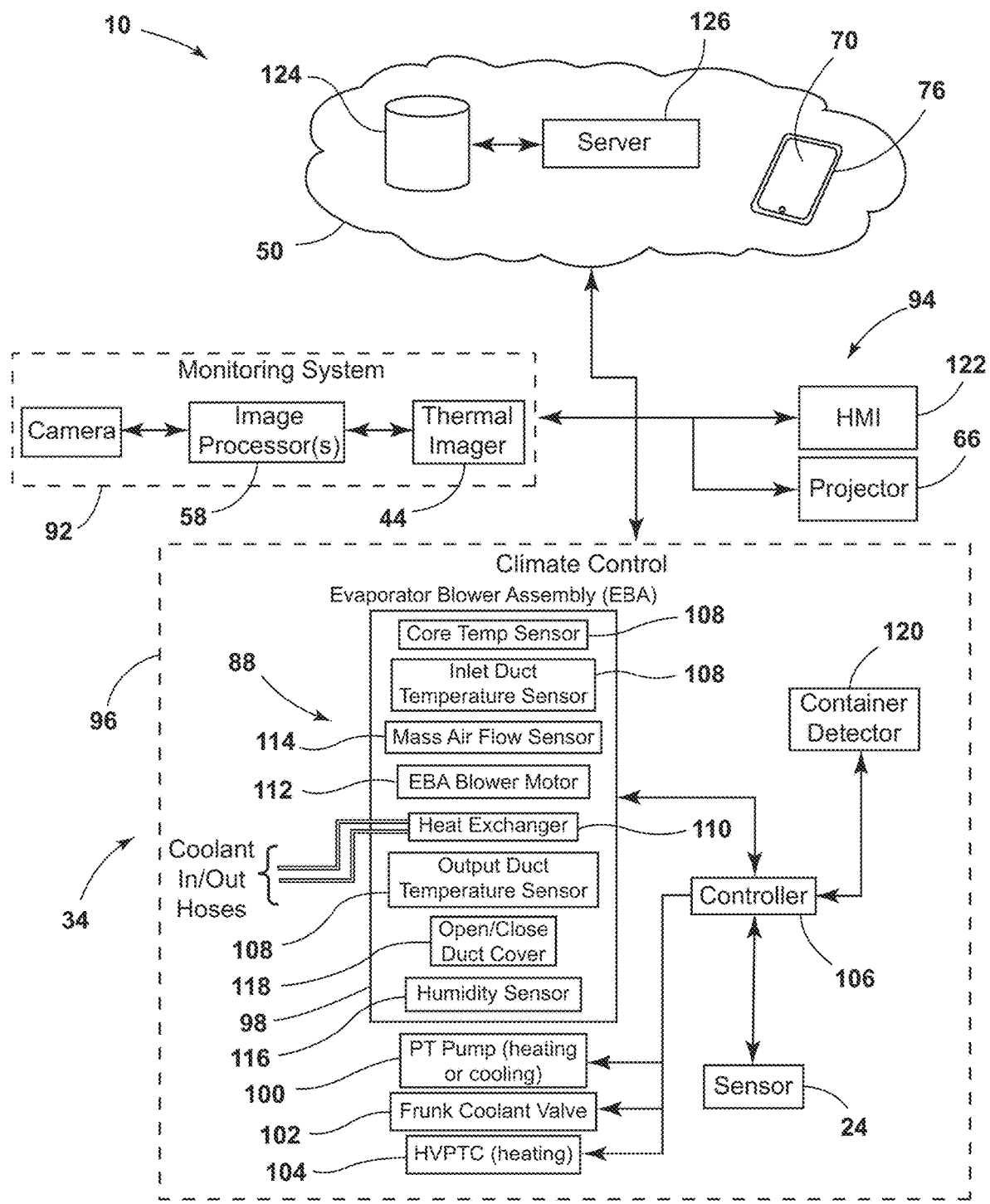
FIG. 3 is a block diagram of a climate management system according to one aspect of the present disclosure.

Referring now to FIG. 3, the climate management system 10 includes the wireless communication circuit 50 in communication with the control circuitry 34. The control circuitry 34 includes a monitoring system 92, a notification system 94, and a climate control system 96. The climate control system 96 includes an evaporator blower assembly (EBA) 98, a pump 100, a coolant valve 102, and a heater 104 in communication with a controller 106 that is configured to control the EBA 98, the pump 100, the coolant valve 102, and/or the heater 104 via electrical signals. For example, based on temperatures of the EBA 98 monitored by the controller 106, the controller 106 may communicate electrical signals to activate and/or deactivate the first and second actuators of the EBA 98. Although other heat control methods may be employed by the present climate management system 10, the present EBA 98 may include various temperature sensors 108 operably coupled with inlet and/or outlet ducts of each of the at least one fluid connection 26, 28. The one or more temperature sensors 108 may also include a temperature sensor 108 configured to monitor the temperature of a heat exchanger 110 and/or a blower motor 112 of the EBA 98. At least one airflow sensor 114 may be provided in one or more of the inlet or outlet ducts of the fluid connections 26, 28. For example, the airflow sensor 114 may be a mass airflow sensor 114 configured to detect an amount of air flowing through the inlet and/or outlet ducts. It is contemplated that other sensors configured to detect airflow through the inlet and/or outlet ducts may be provided and in communication with the controller 106. A humidity sensor 116 may also be included in the EBA 98 for detecting a humidity level in the compartment 12 and/or in the EBA 98. For example, coolant may be exchanged in the heat exchanger 110 to cause condensation to form in the EBA 98. The humidity sensor 116 may be employed to detect accumulation of such condensation or water vapor within the EBA 98 and alert the user 36 to a humidity condition of the EBA 98. Such communication may include instructions to activate or deactivate the climate control system 96, or adjust an operation of the climate control system 96 to reduce the humidity.

In operation, the controller 106 may detect the environmental condition of the compartment 12 and/or the EBA 98 and communicate electrical signals to one or more of the blower motor 112, the heat exchanger 110, the pump 100, the coolant valve 102, and the heater 104 to control the heating, cooling, ventilation, or another environmental aspect of the compartment 12. For example, the controller 106 may be configured to compare temperature data captured by the temperature sensors 108 to a target temperature set by the user 36 and/or set by an algorithm executed by the control circuitry 34 in response to detection and classification of the objects 52 to be loaded into the compartment 12. In some examples, contents of the compartment 12 may be identified and classified after being loaded into the compartment 12, and the target temperature may be set upon identification of the contents.

The controller 106 may further be in communication with a duct cover sensor 118, which may be a limit switch and/or an analog output device that detects the position of a cover of one or more of the inlet or outlet ducts for each of the first and second fluid connections 26, 28. Based on the position of the duct cover sensor 118, the controller 106 may control heating or cooling of the compartment 12. For example, if the contents in the compartment 12 are pushing the duct cover closed, the controller 106 may be configured to communicate an instruction to the user 36 to adjust the contents of the compartment 12, prior to the controller 106 activating or deactivating the first or second actuator to reach the target temperature. It is contemplated that the described examples herein are nonlimiting and are merely exemplary. The present temperature sensors 108, humidity sensors 116, airflow sensors 114, duct cover sensors 118, or any other detection of the climate control system 96 may be used to control any of the output devices previously described to achieve the target environmental conditions for the compartment 12.

Still referring to the climate control system 96 in FIG. 3, a detector 120 configured to detect the presence of the container 38 in the compartment 12 is in communication with the controller 106. Further, the sensor 24 configured to detect the presence or absence of the divider 16 may also be in communication with the controller 106. In this way, the controller 106 may control the first and/or second actuators, the EBA 98, the pump 100, the coolant valve 102, and/or the heater 104 based on the presence or absence of the container 38 and/or the divider 16. For example, when the container 38 or the divider 16 is present, the controller 106 may actuate the first actuator to provide cool air to the first zone 18 and actuate the second actuator to provide warm air to the second zone 20. In particular, when the container 38 is present, the controller 106 may actuate the first container 38 of the first actuator to heat or cool the inside 40 of the container 38 and control the second actuator to heat or cool the second zone 20 in a different way or to a different temperature than the heating or cooling method for the inside 40 of the container 38. As previously described, such controlling methods are exemplary and nonlimiting, such that other controlling methods employed by the climate management system 10 may be based on the presence or absence of the container 38 and/or the divider 16. However, in general, the present climate management system 10 may employ the sensor 24 and the detector 120 to achieve dynamic climate control over the compartment 12 to allow for storage of contents having low target temperatures and high target temperatures simultaneously.

Figure 6:
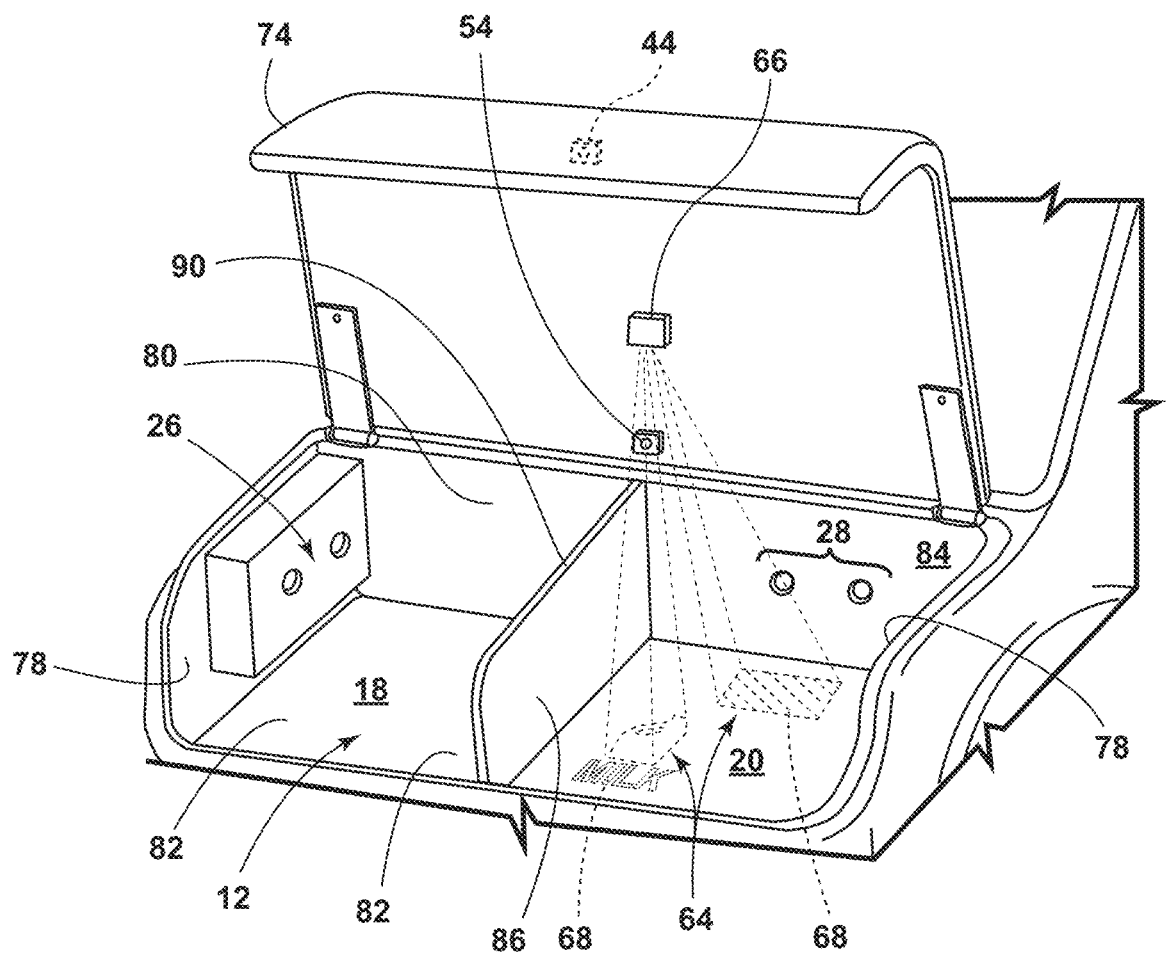
FIG. 6 is a perspective view of a compartment of a vehicle incorporating a projector that projects a pattern of light indicating a target position in the compartment.

Still referring to FIG. 3, the climate control system 96 may be in communication with the projector 66 as previously described. For example, as will be illustrated in FIG. 6, the projector 66 may be configured to project the light pattern 68 onto the floor 82 or another part of the wall 22 from above. For example, the projector 66 may be mounted in or on the door 74. The climate control system 96 may further be in communication with and/or include a human-machine interface (HMI) 122 that is disposed in the passenger compartment 12 of the vehicle 14, as well as the mobile device 76 (FIGS. 1 and 6). The mobile device 76 and/or the HMI 122 may incorporate the display 70 previously described. For example, a screen of the mobile device 76 and/or the HMI 122 may be employed to present messages generated by the control circuitry 34. Further, the mobile device 76 and/or the HMI 122 may be used by the user 36 to select the options 72 previously described, as will be further described in reference to FIG. 7.

Figure 4:
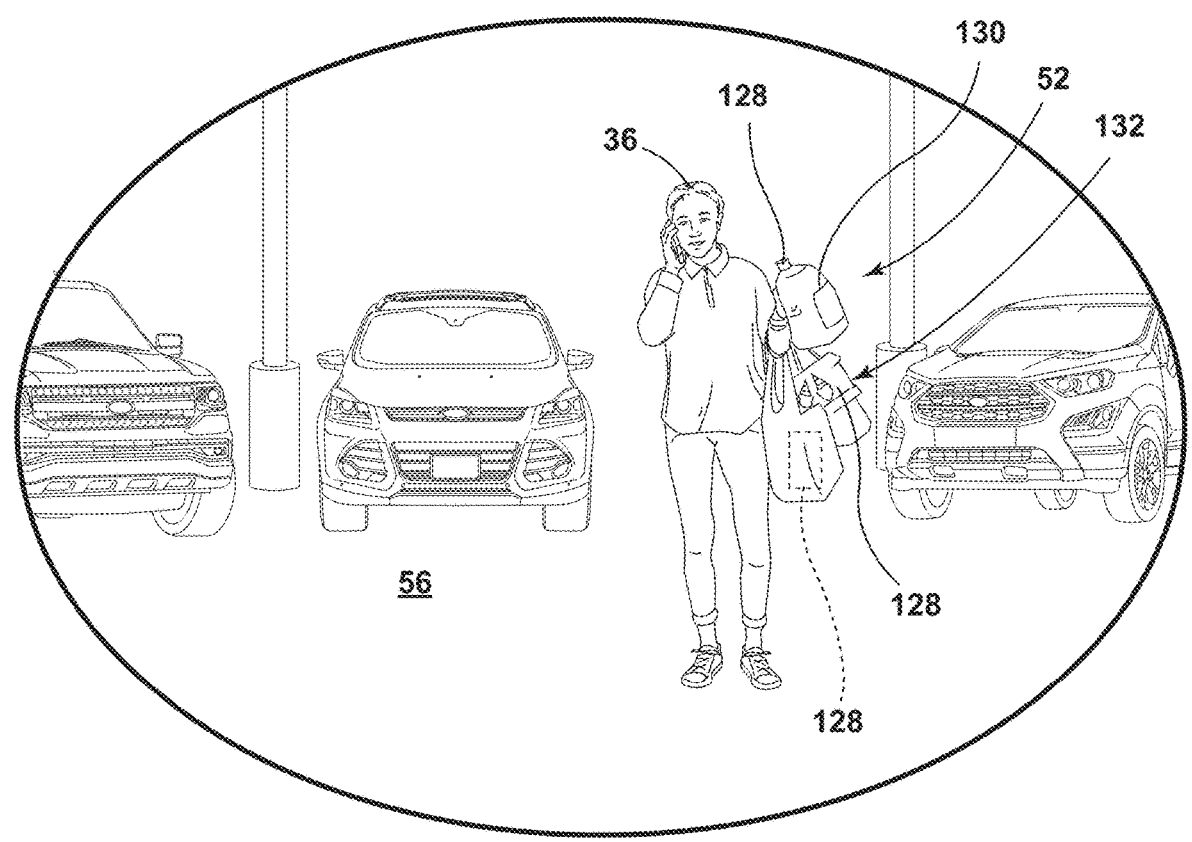
FIG. 4 is an exemplary image of a user holding groceries approaching a compartment of a vehicle.
Figure 5:
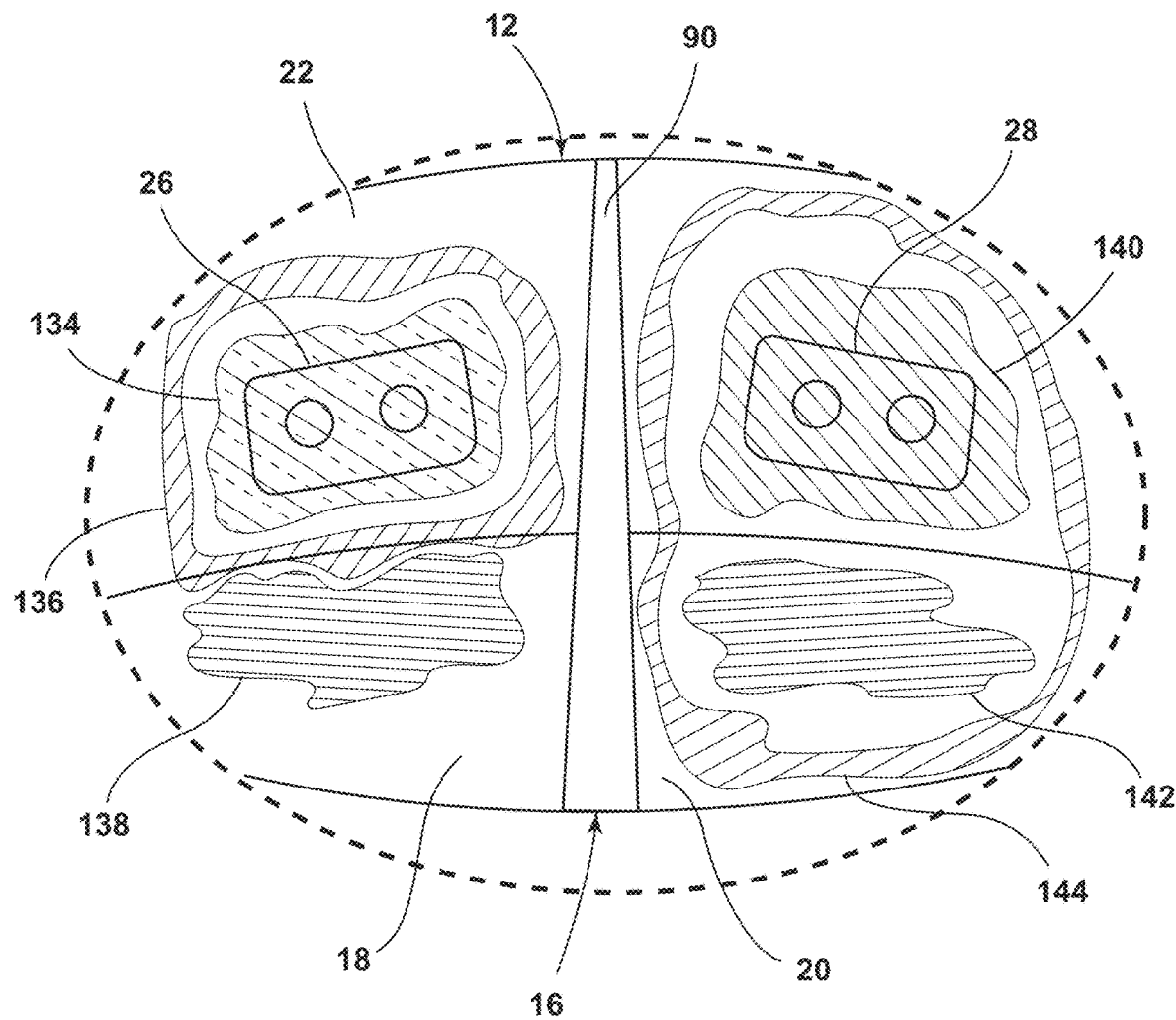
FIG. 5 is a representation of a thermal image captured by a thermal imager directed toward a compartment of a vehicle according to one aspect of the present disclosure.

With continued reference to FIG. 3, the monitoring system 92 may include the image processor 58 previously described, as well as the camera 54 and the thermal imager 44 previously described, and as will be generally demonstrated with reference to FIGS. 4 and 5. The climate control system 96 may utilize data captured by the camera 54 and/or the thermal imager 44 to adjust the actuators to adjust heating or cooling levels of the compartment 12. Further, the climate control system 96 may utilize the wireless communication circuit 50 to access the payment information of the user 36 stored in a database 124 that is accessible by a server 126. For example, recent purchases or historical purchases by the user 36 may be stored in or accessible by the control circuitry 34 upon granting access by the user 36 to allow the control circuitry 34 to access the database 124 and server 126. For example, the user 36 may initiate approval for the climate control system 96 and/or the climate management system 10 to access bank account information, credit card information, or other payment protocol information related to charges, debits, credits, or the like stored by financial service providers. Communication between the control circuitry 34 and the wireless communication circuit 50 may be achieved by any wireless communication protocol, such as Wi-Fi, mobile data, SMS, Bluetooth®, ZigBee®, near-field communications, or any other wireless communication protocol not previously described. It is contemplated that authentication may be performed by the climate management system 10 to confirm an identity of the user 36 accessing the server 126 and/or database 124.

Referring now to FIGS. 3 and 4, the camera 54 may be configured to capture images of the user 36 and the object 52 in the region exterior 56 to the vehicle 14. For example, as the user 36 approaches the vehicle 14, the camera 54 may capture the images and the image processor 58 may process the images to detect the objects 52 and the occupant 36. For example, the image processor 58 may employ edge detection and/or other recognition algorithms to identify the objects 52. In an exemplary demonstration, the objects 52 are groceries 128 having differing target temperatures. For example, the image processor 58 may detect a container of milk 130 and ice cream 132, and classify the container of milk 130 and the ice cream 132 as refrigerable items and/or freezer-items. Accordingly, the climate control system 96 may control the pump 100, the heater 104, the coolant valve 102, the heat exchanger 110, and/or one or more of the actuators to cool one or more of the two zones 18, 20 in the compartment 12. Alternatively, if the container 38 is detected in the compartment 12, the controller 106 may specifically cool the inside 40 of the container 38 and leave the remainder 42 of the first zone 18 and the second zone 20 in a default atmospheric state (e.g., a temperature of the region exterior to the vehicle). In this way, the present climate management system 10 may utilize the images captured by the camera 54 to control the climate of the compartment 12. In at least one example, the camera 54 is mounted to an underside of the door 74 for monitoring the contents of the cabin 12 when the door 74 is open or closed. The camera 54 may be placed in any position that allows detection of the user 36 approaching the vehicle 14.

Referring now to FIG. 5, the target placements may be determined by the control circuitry 34 based on temperatures captured by the thermal imager 44 of various areas in the two zones 18, 20. The thermal data may correspond to highlighted regions correlated to temperature ranges in 134-144 in the compartment 12. For example, the temperature regions 134-144 may include warm temperature regions 134, 136, 138 and cool temperature regions 140, 142, 144. In the illustrated example, the climate control system 96 has activated a heating cycle for the left side of the compartment 12 (e.g., the first zone 18) and a cooling cycle for the right side of the compartment 12 (e.g., the second zone 20). As illustrated, a first warm temperature region 134 may be formed around the first fluid connection 26. A second warm temperature region 136 may be formed around the first warm temperature region 134 due to the heat dissipating from the first fluid connection 26. Lastly, a third warm temperature region 138 may be formed in areas most distant from the first fluid connection 26. For example, during the heating cycle employed in FIG. 5, hot or warm air communicated into the first zone 18 may dissipate or flow through the entire first zone 18 but may be focused in spots near the first fluid connection 26 and less focused around a periphery of the first zone 18 due to heat dissipation through the wall 22 and/or the divider 16. Although the wall 22 and the divider 16 may be thermally insulated via insulation, such as fiberglass insulation or the like, the warmest points in the first zone 18 in the present example may be proximate to the first fluid connection 26. Similarly, the cool temperature regions 140, 142, 144 may include a first cool temperature region 140 focused around the second fluid connection 28 and below the second connection due to the rise of heat in the second zone 20. A second cool temperature region 142 may be formed around the first cool temperature region 140. Further, a third cool temperature region 144 may be formed along peripheral regions of the second zone 20, and in particular, may be formed near the divider 16 due to heat dissipation from the first zone 18 entering the second zone 20. As previously described, the divider 16 may be thermally insulated, such that the panel 86 may resist heat flow between the two zones 18, 20. However, heating or cooling of the divider 16 may result in some limited heat dissipation through the divider 16.

In general, the first warm temperature region 134 may correspond to the highest temperatures in the compartment 12, and the first cool temperature region 140 may correspond to the lowest temperatures in the compartment 12. In general, the climate control system 96 may be operable to achieve temperatures ranging between 14° F. and 100° F. (−10° C. and 38° C.). Thus, the present climate management system 10 may be provided to achieve heating and cooling enhancements for the compartment 12 of the vehicle 14.

Referring now to FIG. 6, the target position may be indicated by the pattern of light 68 projected by the projector 66. For example, the groceries 128 identified in the images, such as the image in FIG. 4, may have target positions corresponding to target temperatures for the groceries 128. For example, the gallon of milk 130 may have a target position in the second cool temperature region 142, and the ice cream 132 may have a target position in the first cool temperature region 140 based on optimal temperatures for storage of the groceries 128. Accordingly, the indication 64 by the projector 66 may be achieved by a direction of light projection from the projector 66 aligning with the target placements. For example, an insignia or another pattern formed by the pattern of light 68 may be projected onto the floor 82 of the compartment 12 to indicate to the user 36 where to place the groceries 128. In this way, the insignia may be a symbol or word associated with the particular identity of the object 52.

Still referring to FIG. 6, the thermal imager 44 may be mounted in or on the door 74 of the compartment 12, or in a position above the compartment 12 in the sidewall 78. For example, and with brief reference back to FIG. 5, the thermal imager 44 may be positioned slightly above the divider 16 in the door 74 to capture thermal data of both the first and second zones 18, 20. In some examples, as an alternative or in addition to employment of the camera 54 to capture the images of the objects 52, recent purchase information, such as purchases at a store having the groceries 128, may be accessed and the control circuitry 34 may "wake up" or initiate a cooling or heating cycle for one or more of the two zones 18, 20 based on the recent purchase history. Accordingly, the camera 54 may be omitted in some examples and the climate management system 10 may access the database 124 and remote server 126 to use the payment information as a basis for controlling the climate management system 10.

Additionally, or alternatively, the wireless communication circuit 50 may be configured to access location and/or Global Positioning System (GPS) data to allow the climate management system 10 to predict a future purchase by the user 36. Accordingly, habits, coupled with historical information related to user purchases may be employed by the climate management system 10 to predict the objects 52 that will be loaded into the compartment 12 and may therefore activate or deactivate the first and/or second actuators to control the fluid flow into the compartment 12 to heat or cool the compartment 12. In this way, various automatic sequences or operations for controlling the climate of the compartment 12 may be performed by the climate management system 10 of the present disclosure.

Figure 7:
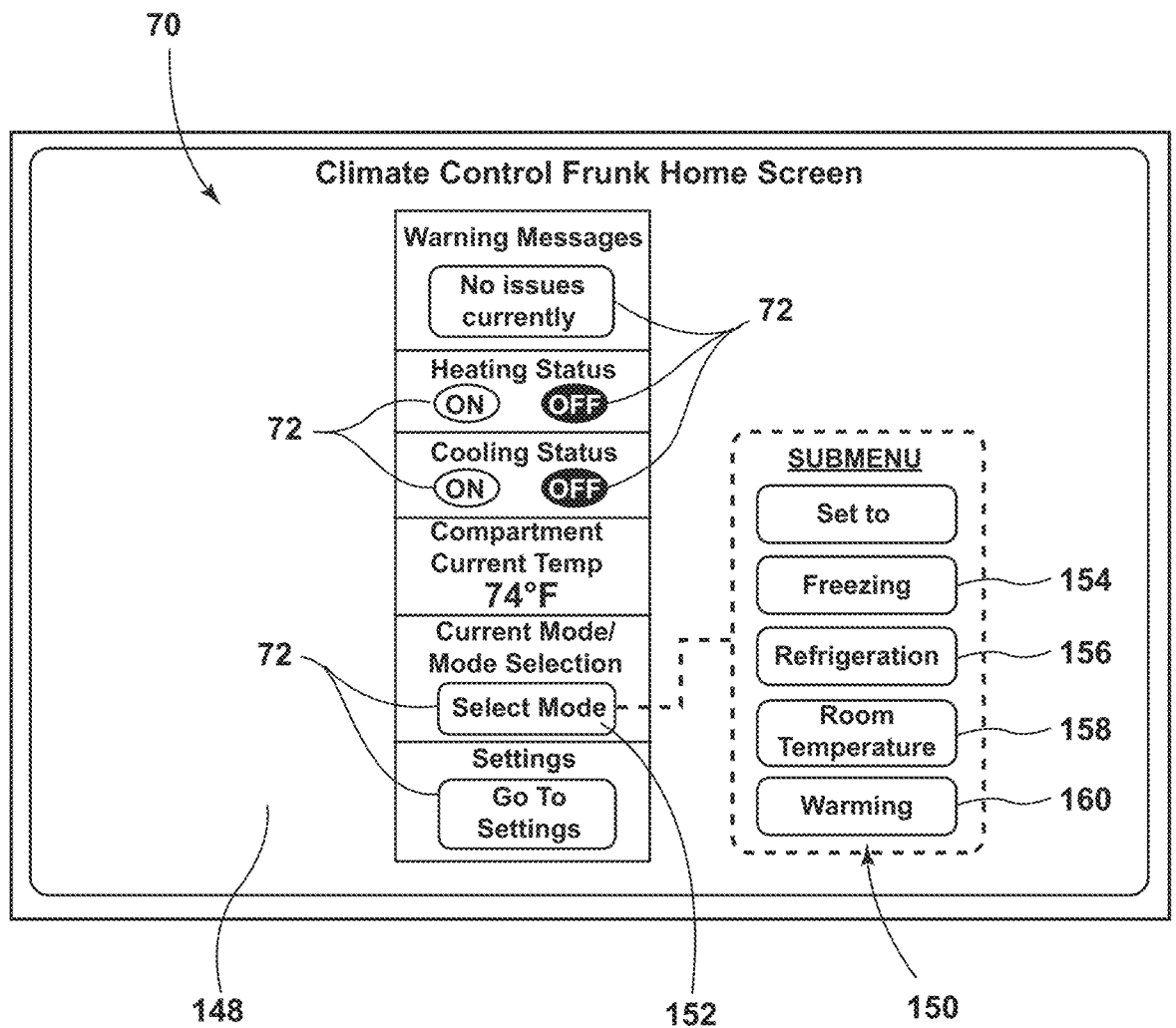
FIG. 7 is an exemplary screen for a display of a climate management system of the present disclosure.

Referring now to FIG. 7, an exemplary screen 148 of the display 70 may present diagnostic information, such as the temperature, humidity, or another environmental aspect of the compartment 12. The display 70 may further present the options 72 previously described for allowing the user 36 to select various cycles and/or target temperatures or target environmental conditions for the compartment 12. For example, digital switches 150 may be presented to allow the user 36 to select a heating mode or a cooling mode for one or both of the two zones 18, 20. Further, an operational selection switch 152 may be presented on the screen 148 to allow the user 36 to adjust between manual control and various automatic cycles. For example, the user 36 may select a freezing option 154, a refrigeration option 156, a room temperature option 158, a warming option 160, or any other option corresponding to temperature and/or humidity conditions for the compartment 12. For example, the user 36 may select the desired temperature for the entire compartment 12 or for each individual zone of the two zones 18, 20. The diagnostic information on the screen 148 of the display 70 may present any issues related to the control circuitry 34, including limited operation of the thermal imager 44, the camera 54, the EBA 98, or any other part of the control circuitry 34. In this way, the user 36 may use the mobile device 76 and/or the HMI 122 to control operation of the climate control system 96 to control heating or cooling of the compartment 12.

In general, the climate management system 10 of the present disclosure may provide for enhanced experiences related to inventory management. For example, enhanced experiences may be provided for grocery shopping, tailgating, camping with refrigerated and/or frozen food, traveling with items that cannot overheat without degradation, long-term storage of batteries, electronics, or chemicals, objects 52 that need freezing prevention, or the like. Further, by employing the various sensing features (e.g., the sensor 24, the camera 54, the thermal imager 44, etc.), the present climate management system 10 may be dynamically operated to achieve desired temperatures and to determine the desired temperatures for the objects 52 to be loaded in the compartment 12 or contents in already in the compartment 12. Further, the present climate management system 10 may detect misplacement of the objects 52 from the target positions and communicate various instructions to the user 36 via the display 70 to adjust the position of the objects 52 in the compartment 12. By providing a way for recognizing the presence or absence of the divider 16, the present climate management system 10 may further provide for distinct heating and cooling zones in the compartment 12 that may occur simultaneously with one another. Further, by sampling or detecting the environmental conditions in the compartment 12 depending on the temperature, humidity, and/or airflow sensors 108, 116, 114, the climate management system 10 may more precisely achieve the desired temperatures set by the user 36 or automatically set by the climate management system 10.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A climate management system for a compartment of a vehicle, comprising:
    a divider selectively disposed in the compartment to divide the compartment into two zones in response to connection with a wall of the compartment;
    a sensor monitoring the compartment and configured to detect the divider in the compartment;
    at least one fluid connection in the compartment;
    at least one actuator configured to control fluid flow through the at least one fluid connection;
    control circuitry in communication with the sensor and the at least one actuator and configured to communicate a signal to adjust the at least one actuator based on the detection of the divider, wherein the at least one fluid connection includes a first fluid connection controlled by a first actuator and in fluid communication with a first zone of the two zones;
    a thermal imager in communication with the control circuitry and configured to capture thermal data of the compartment, wherein the control circuitry is further configured to determine a plurality of climates in the compartment based on the thermal data;
    a camera in communication with the control circuitry and configured to capture images of a region exterior to the vehicle, wherein the control circuitry further comprises an image processor configured to estimate an identity of the objects to be stored in the compartment based on the images, wherein the image processor is further configured to determine target placements for the objects based on the identity of the objects and the plurality of climates, wherein determining the target placements is based further on a target temperature for the objects, wherein the control circuitry is further configured to estimate the target temperature for the objects based on the identity of the objects, wherein the control circuitry is further configured to communicate an indication to place the objects in the target placements; and
    a projector in communication with the control circuitry and configured to project the indication in the compartment.

2. The climate management system of claim 1, further comprising:
    a container coupled with the first fluid connection providing fluid communication to an inside of the container.

3. The climate management system of claim 2, wherein the inside of the container is fluidly isolated from a remainder of the first zone.

4. The climate management system of claim 1, further comprising:
    a wireless communication circuit in communication with the control circuitry and configured to receive purchase information for a user, wherein the control circuitry is further configured to estimate an identity of objects to be placed in the compartment based on the purchase information.

5. The climate management system of claim 1, wherein the indication includes a light pattern illuminating the target placements.

6. The climate management system of claim 1, wherein the at least one fluid connection includes a second fluid connection controlled by a second actuator and in fluid communication with a second zone of the two zones, wherein the plurality of climates includes a first climate corresponding to the first zone and a second climate corresponding to the second zone.

7. The climate management system of claim 6, wherein the control circuitry is further configured to selectively activate the first and second actuators to adjust the first climate and the second climate.

8. The climate management system of claim 1, further comprising:
    a display in communication with the control circuitry and configured to present options to a user, wherein the control circuitry is configured to control heating and cooling of the compartment based on selection of the options.

9. A climate management system for a compartment of a vehicle, comprising:

a divider selectively disposed in the compartment to divide the compartment into two zones in response to connection with a wall of the compartment;

a sensor monitoring the compartment and configured to detect the divider in the compartment;

a camera configured to capture an image of objects to be stored in the compartment; and control circuitry in communication with the sensor, the camera, and a first actuator, and is configured to determine an identity of an object to be stored in the compartment based on the image, determine one of the two zones to place the object based on the identity, and communicate an instruction to present an indication of the one of the two zones to place the object.

10. The climate management system of claim 9, further comprising:

a thermal imager in communication with the control circuitry and configured to capture thermal data of the compartment, wherein the determination of the one of the two zones to place the object is based further on the thermal data.

11. The climate management system of claim 9, further comprising:

a projector in communication with the control circuitry and configured to project the indication in the compartment.

12. A climate management system for a compartment of a vehicle, comprising:

a divider selectively disposed in the compartment to divide the compartment into two zones in response to connection with a wall of the compartment;

a sensor monitoring the compartment and configured to detect the divider in the compartment;

a camera configured to capture an image of objects to be stored in the compartment;

control circuitry in communication with the sensor, the camera, and a first actuator, and is configured to determine an identity of an object to be stored in the compartment based on the image, determine one of the two zones to place the object based on the identity, and communicate an instruction to present an indication of the one of the two zones to place the object; and a projector in communication with the control circuitry and configured to project the indication in the compartment.

* * * * *